(12) United States Patent
Kitagawa

(10) Patent No.: US 8,757,492 B2
(45) Date of Patent: Jun. 24, 2014

(54) SCANNER DEVICE AND COMPUTER PROGRAM PRODUCT

(75) Inventor: Toru Kitagawa, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/429,645

(22) Filed: Mar. 26, 2012

(65) Prior Publication Data

US 2012/0248191 A1 Oct. 4, 2012

(30) Foreign Application Priority Data

Mar. 28, 2011 (JP) ................................. 2011-069436

(51) Int. Cl.
*G06K 7/10* (2006.01)
*G06K 5/00* (2006.01)

(52) U.S. Cl.
USPC .................. 235/462.22; 235/454; 235/462.24

(58) Field of Classification Search
USPC ................................ 235/462.01–462.49, 454
See application file for complete search history.

(56) References Cited

U.S. PATENT DOCUMENTS

| 5,401,949 A | * | 3/1995 | Ziemacki et al. | ......... 235/462.16 |
| 2005/0067494 A1 | * | 3/2005 | Ito et al. | ......................... 235/454 |
| 2006/0113390 A1 | * | 6/2006 | Muramatsu | .............. 235/462.27 |

FOREIGN PATENT DOCUMENTS

| JP | 06-012514 A | 1/1994 |
| JP | 07-049919 A | 2/1995 |
| JP | 08-147403 A | 6/1996 |
| JP | 09-006885 A | 1/1997 |

* cited by examiner

*Primary Examiner* — Michael G Lee
*Assistant Examiner* — Laura Gudorf
(74) *Attorney, Agent, or Firm* — Holtz Holtz Goodman & Chick PC

(57) ABSTRACT

Disclosed is a scanner device comprising: a scanner unit that scans a symbol and obtains image data; a judgment unit that judges whether or not a capture distance from the scanner unit to the symbol is a short distance; and a decoding unit that, in a case where the capture distance is judged to be the short distance, makes setting to perform at least one of increase of error permissivity for the image data with respect to threshold values for judging a size of the symbol, and reduction of the number of collation times for decoding results of the image data, in a case where the capture distance is judged to be a long distance, makes setting to perform at least one of lowering of the error permissivity, and increase of the number of collation times; and decodes the image data in response to the setting.

6 Claims, 11 Drawing Sheets

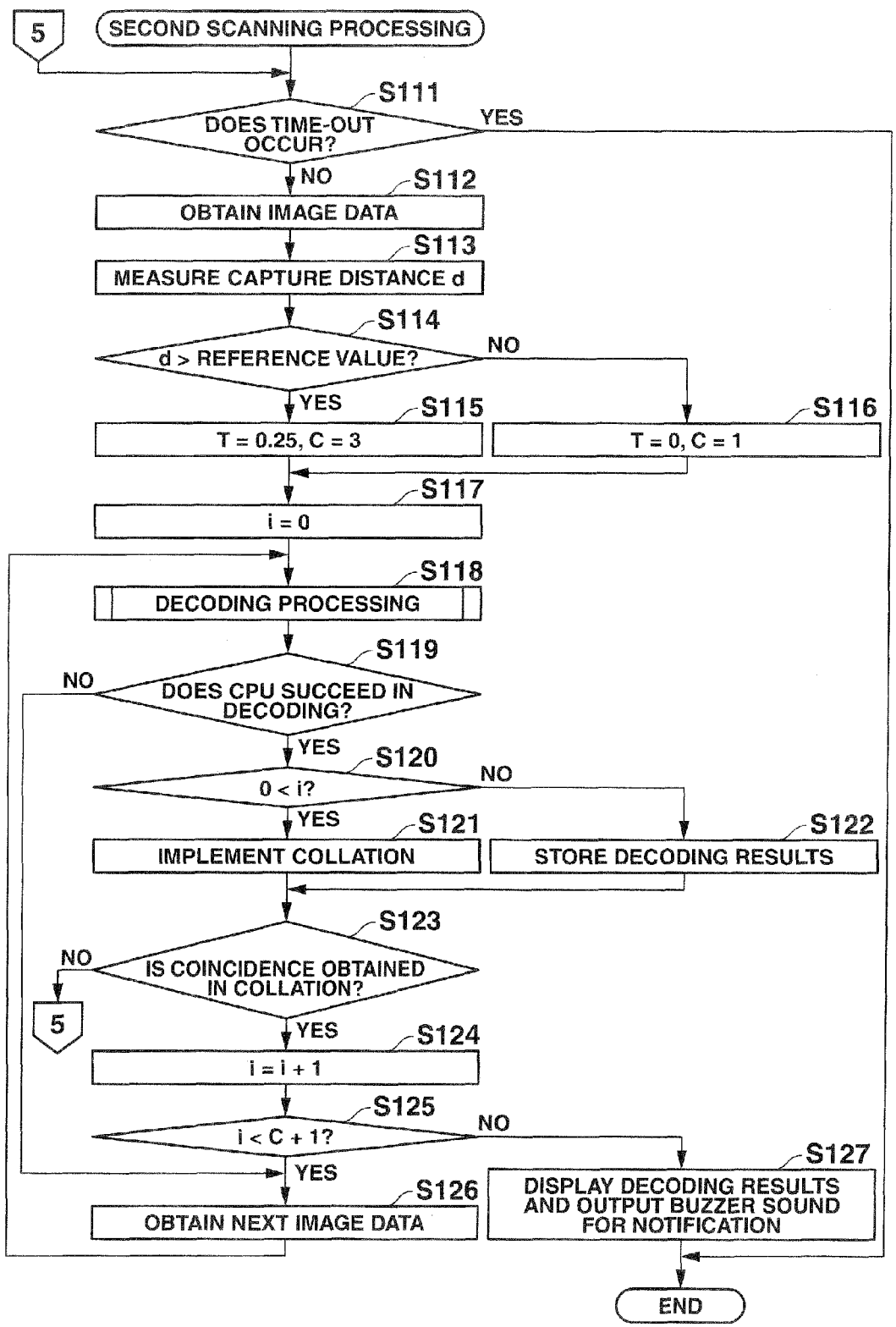

SCANNER DEVICE AND COMPUTER PROGRAM PRODUCT

CROSS-REFERENCE TO RELATED APPLICATIONS

This application is based upon and claims the benefit of priority from the prior Japanese Patent Application No. 2011-069436, filed on Mar. 28, 2011, the entire contents of which are incorporated herein by reference.

BACKGROUND OF THE INVENTION

1. Field of the Invention

The present invention relates to a scanner device and a computer program product.

2. Description of Related Art

Heretofore, a scanner device has been known, which scans a one-dimensional bar code by using a laser beam. This scanner device decodes, by using a predetermined threshold value, image data obtained by emitting the laser beam while swinging the laser beam in a lateral direction, and by receiving reflected light of the laser beam, which is reflected on the bar code, and thereby scans the bar code.

In capturing the bar code, it is required that a capture response be enhanced and accelerated, and that decoding accuracy be enhanced. For the purpose of enhancing such a capture response in the decoding, in a scanner device having a double reading prevention function, a configuration has been known, which judges that double reading is performed on purpose in the case where an acceleration detected by an accelerometer changes to a predetermined value, and then decodes image data (for example, refer to Japanese Patent Laid-Open Publication No. H08-147403).

Moreover, a scanner device has been known, which, for the purpose of enhancing the capture response in the decoding, changes and decodes image data to a BCD code with a small number of bits (for example, refer to Japanese Patent Laid-Open Publication No. H07-49919).

Moreover, a scanner device has been known, which, for the purpose of enhancing the decoding accuracy, corrects threshold values for each of characters, and decodes the image data by using the corrected threshold values (for example, refer to Japanese Patent Laid-Open Publication No. H09-6885).

Furthermore, a scanner device has been known, which, for the purpose of enhancing the decoding accuracy, does not decode the image data in the case where a bar width is smaller than a predetermined width, and where a capture distance is long (for example, refer to Japanese Patent Laid-Open Publication No. H06-12514). This is because the decoding accuracy is decreased when the capture distance is long.

However, in the conventional scanner devices, it has been impossible to appropriately set the capture response and the decoding accuracy in response to the capture distance of a symbol.

SUMMARY OF THE INVENTION

It is an object of the present invention to appropriately set the capture response and the decoding accuracy in response to the capture distance of the symbol.

According to an aspect of the present invention, there is provided a scanner device comprising:

a scanner unit that scans a symbol and obtains image data;

a judgment unit that judges whether or not a capture distance from the scanner unit to the symbol is a short distance; and a decoding unit that, in a case where the capture distance is judged to be the short distance, makes setting so as to perform at least one of increase of error permissivity for the image data with respect to threshold values for judging a size of the symbol, and reduction of the number of collation times for decoding results of the image data, in a case where the capture distance is judged to be a long distance, makes setting so as to perform at least one of lowering of the error permissivity for the image data with respect to the threshold values, and increase of the number of collation times; and then decodes the image data in response to the setting.

According to another aspect of the present invention, there is provided a computer program product that is readable by a computer for use in a scanner device and encodes a command to execute computer processing, the computer processing comprising:

a scanning step of scanning a symbol and obtaining image data;

a judgment step of judging whether or not a capture distance from a scanner unit to the symbol is a short distance; and a decoding step of, in a case where the capture distance is judged to be the short distance, making setting so as to perform at least one of increase of error permissivity for the image data with respect to threshold values for judging a size of the symbol, and reduction of the number of collation times for decoding results of the image data, in a case where the capture distance is judged to be a long distance, making setting so as to perform at least one of lowering of the error permissivity for the image data with respect to the threshold values, and increase of the number of collation times; and then decoding the image data in response to the setting.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 11 is a flowchart showing second scanning processing.

DETAILED DESCRIPTION OF THE PREFERRED EMBODIMENTS

A description is sequentially made below in detail of first and second embodiments according to the present invention with reference to the accompanying drawings.

Note that the present invention is not limited to the illustrated examples.

First Embodiment

A description is made of the first embodiment according to the present invention with reference to FIG. 1 to FIG. 9.

Figure 1:
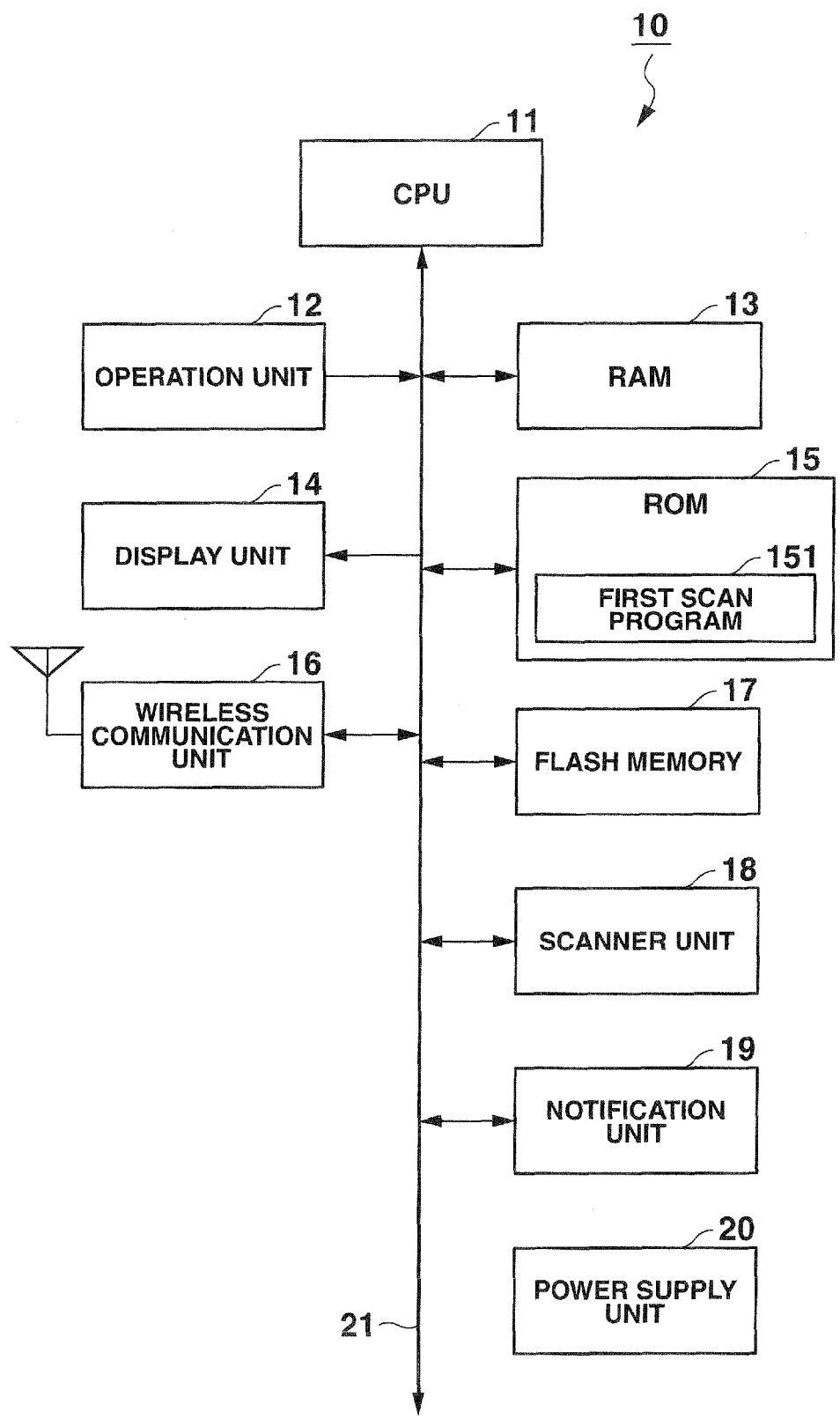
FIG. 1 is a block diagram showing a configuration of a scanner device according to a first embodiment of the present invention.
Figure 2:
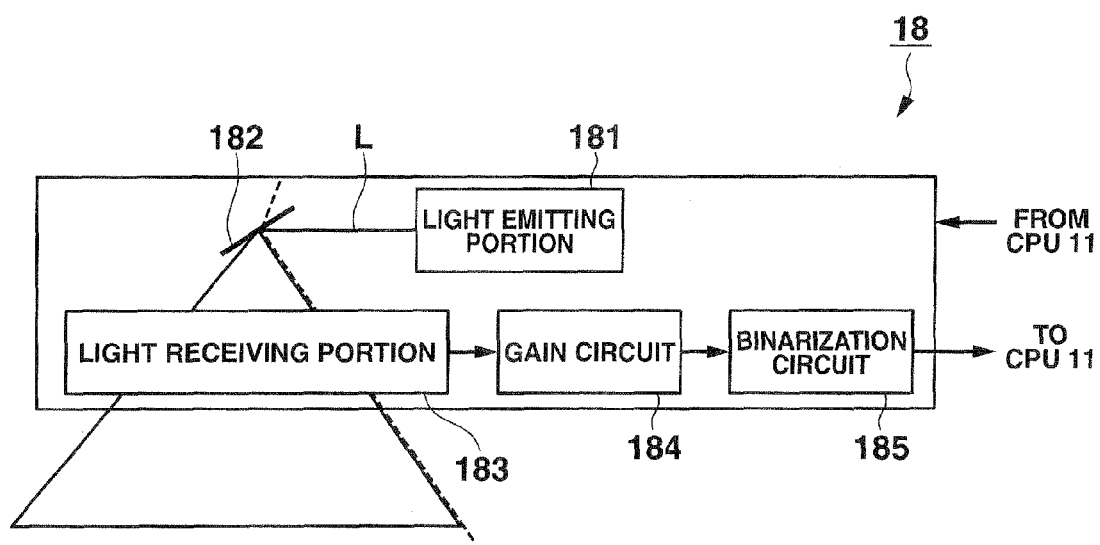
FIG. 2 is a block diagram showing a configuration of a scanner unit.

First, a description is made of a device configuration of this embodiment with reference to FIG. 1 and FIG. 2.

FIG. 1 is a block diagram showing a configuration of a scanner device 10 of this embodiment.

FIG. 2 is a block diagram showing a configuration of a scanner unit 18.

As shown in FIG. 1, the scanner device 10 of this embodiment is a handy terminal that captures and manages a one-dimensional bar code as a symbol that is a capture target. The scanner device 10 is used, for example, at a warehouse and a shop of a retail dealer. The bar code is assigned, for example, to each of commercial goods arrayed in the warehouse, the shop and the like.

The scanner device 10 includes: a central processing unit (CPU) 11 as a judgment unit and a decoding unit; an operation unit 12; a random access memory (RAM) 13; a display unit 14; a read only memory (ROM) 15; a wireless communication unit 16; a flash memory 17; the scanner unit 18; a notification unit 19; and a power supply unit 20. The respective units of the scanner device 10, which exclude the power supply unit 20, are connected to one another through a bus 21.

The CPU 11 controls the respective units of the scanner device 10. The CPU 11 reads out designated programs among a variety of programs from the ROM 15, expands the designated programs in the RAM 13, and executes various pieces of processing in cooperation with the expanded programs.

In accordance with a first scan program 151, the CPU 11 judges whether or not a capture distance from the scanner unit 18 to the bar code is short. In the case of having judged that the capture distance is short, the CPU 11 increases an allowance for an error of image data with respect to a threshold value for judging an element width of the bar code, and reduces the number of times that decoding results are collated. Meanwhile, in the case of having judged that the capture distance is long, the CPU 11 reduces the allowance for the error of the image data with respect to the threshold value, and increases the number of collation times, which is as described above. Then, the CPU 11 decodes the image data in response to such setting as described above.

The operation unit 12 includes a key group composed of a variety of keys such as character input keys, and outputs, to the CPU 11, operation information corresponding to pressing input of the respective keys from a user. The operation unit 12 at least has a trigger key for bar code scan using the scanner unit 18.

The RAM 13 is a volatile semiconductor memory, and has a work area that stores various data and various programs.

The display unit 14 is a display unit that includes a display panel such as a liquid crystal display (LCD) and an electroluminescent (EL) display, and performs a variety of displays on the display panel in response to display information inputted thereto from the CPU 11.

The ROM 15 is a read-only semiconductor memory that stores various data and various programs. The first scan program 151 is stored in the ROM 15.

The wireless communication unit 16 is a wireless communication unit of a cellular phone communication mode. The wireless communication unit 16 includes an antenna, a modulation unit, a demodulation unit, a signal processing unit, and the like, and makes wireless communication with a base station. The wireless communication unit 16 performs signal processing for an information signal, which is to be transmitted, by the signal processing unit, modulates the information signal by the modulation unit, and transmits the modulated information signal as a radio wave from the antenna to the base station. This base station is connected to an instrument as a communication destination through a communication network. Moreover, the wireless communication unit 16 demodulates, by the demodulation unit, a received signal of the radio wave received from the base station by the antenna, performs signal processing for the received signal by the signal processing unit, and obtains received information. In such a way, the wireless communication unit 16 makes communication through the base station with the instrument as the communication destination. Moreover, the wireless communication unit 16 may be made as a wireless communication unit of a wireless local area network (LAN) mode, and may make communication through an access point with the instrument as the communication destination.

The flash memory 17 is a nonvolatile semiconductor memory that stores information readably and writably.

The scanner unit 18 is a laser scanner unit that, in accordance with a control signal of the CPU 11, scans the one-dimensional bar code, obtains the image data of the bar code, and outputs the image data concerned to the CPU 11. As shown in FIG. 2, the scanner unit 18 includes a light emitting portion 181, a vibration mirror 182, a light receiving portion 183, a gain circuit 184, and a binarization circuit 185.

The light emitting portion 181 generates and emits a laser beam L. In accordance with a control signal of the CPU 11, the vibration mirror 182 is vibrated by a motor (not shown) and the like, and thereby reflects the laser beam L emitted from the light emitting portion 181, and extends the reflected laser beam L rightward and leftward. The light receiving portion 183 is a module that receives reflected light obtained as a result that the laser beam L reflected by the vibration mirror 182 is actually incident onto such a capture target (bar code), and then converts the reflected light into an electric signal.

The gain circuit 184 amplifies the electric signal of the reflected light received by the light receiving portion 183, and optimizes a waveform thereof. The binarization circuit 185 converts the electric signal, which is optimized by the gain circuit 184, into binary data as image data, and then outputs the binary data to the CPU 11. The CPU 11 decodes such image data inputted from the binarization circuit 185.

The notification unit 19 is a notification unit that outputs a buzzer sound in response to control of the CPU 11. The notification unit 19 is controlled to output the buzzer sound in the case where the bar code scan has succeeded.

The power supply unit 20 is a secondary battery such as a lithium battery, and supplies power to the respective units of the scanner device 10. A primary battery such as an alkaline battery may also be used for the power supply unit 20.

Next, a description is made of operations of the scanner device 10 with reference to FIG. 3 to FIG. 9.

Figure 3:
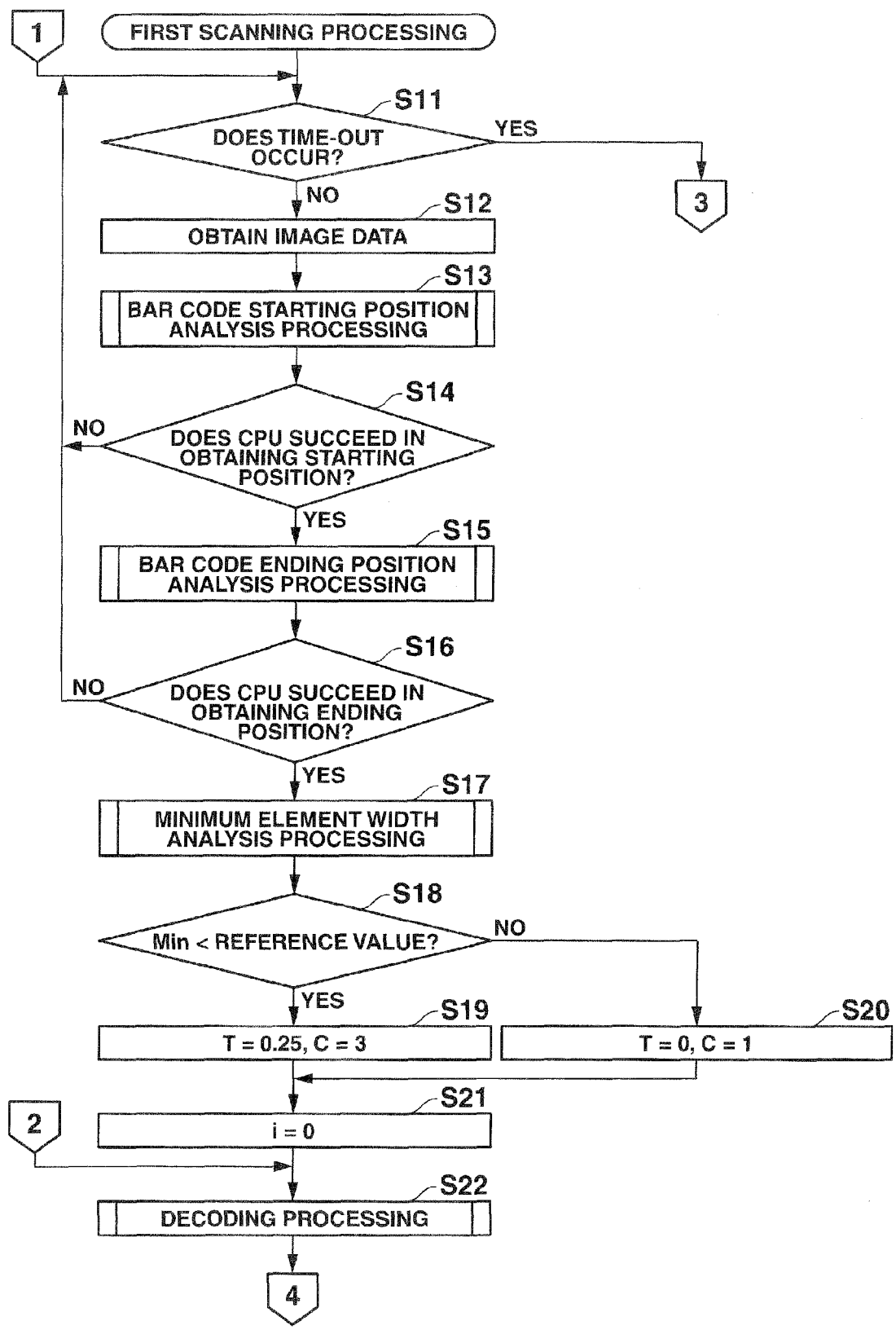
FIG. 3 is a flowchart showing first scanning processing.

FIG. 3 is a flowchart showing first scanning processing.

Figure 4:
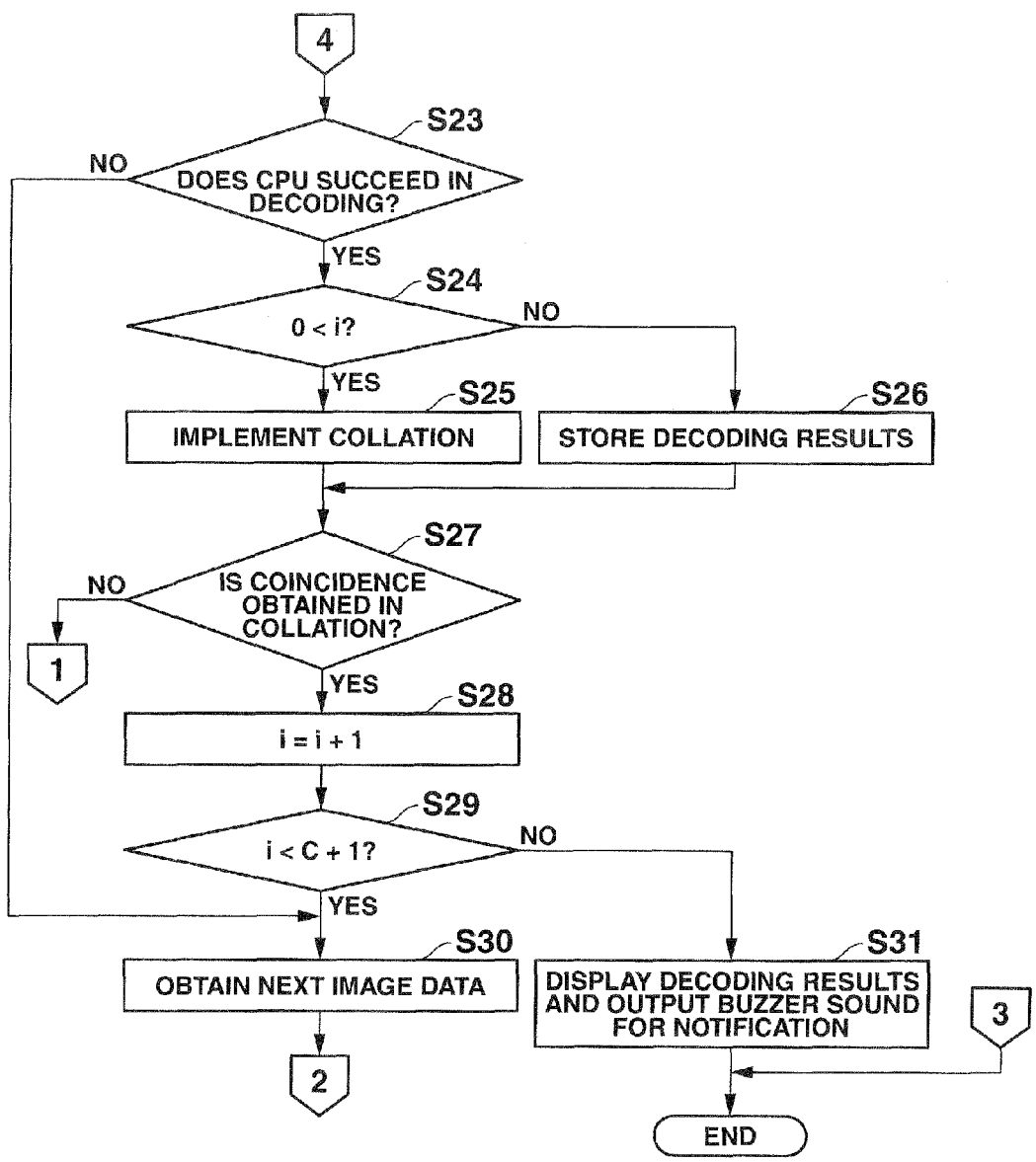
FIG. 4 is a flowchart subsequent to FIG. 3, showing the first scanning processing.

FIG. 4 is a flowchart subsequent to FIG. 3, showing the first scanning processing.

Figure 5:
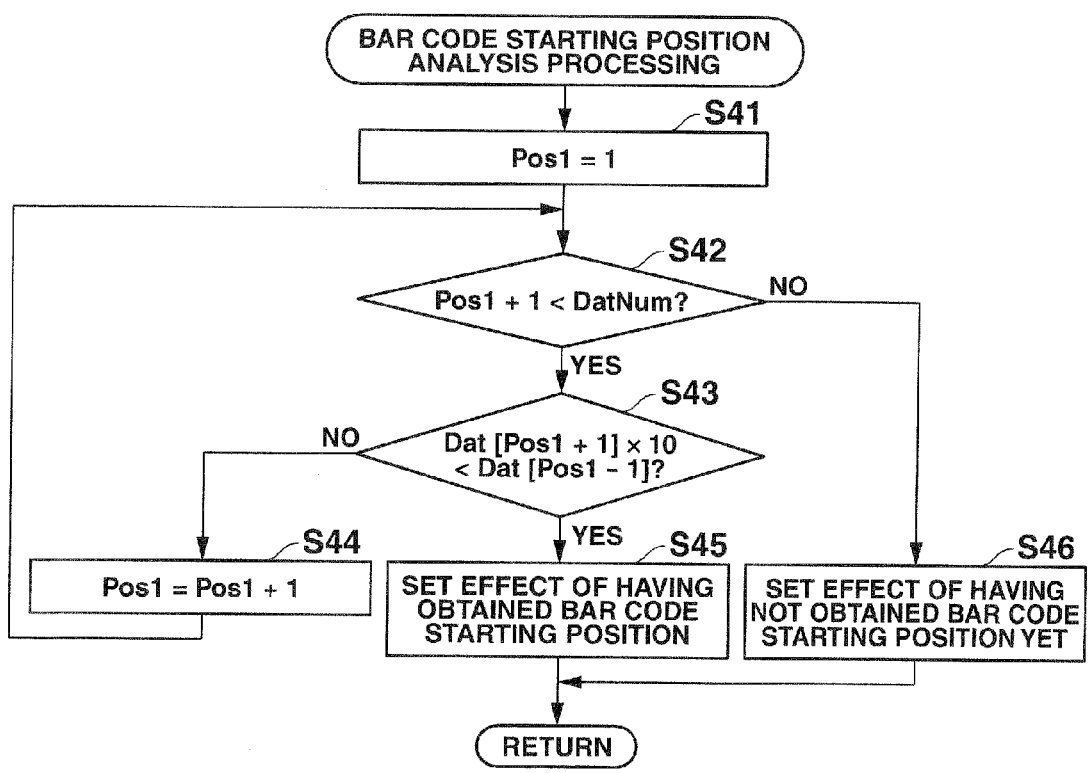
FIG. 5 is a flowchart showing bar code starting position analysis processing of the first scanning processing.

FIG. 5 is a flowchart showing bar code starting position analysis processing of the first scanning processing.

Figure 6:
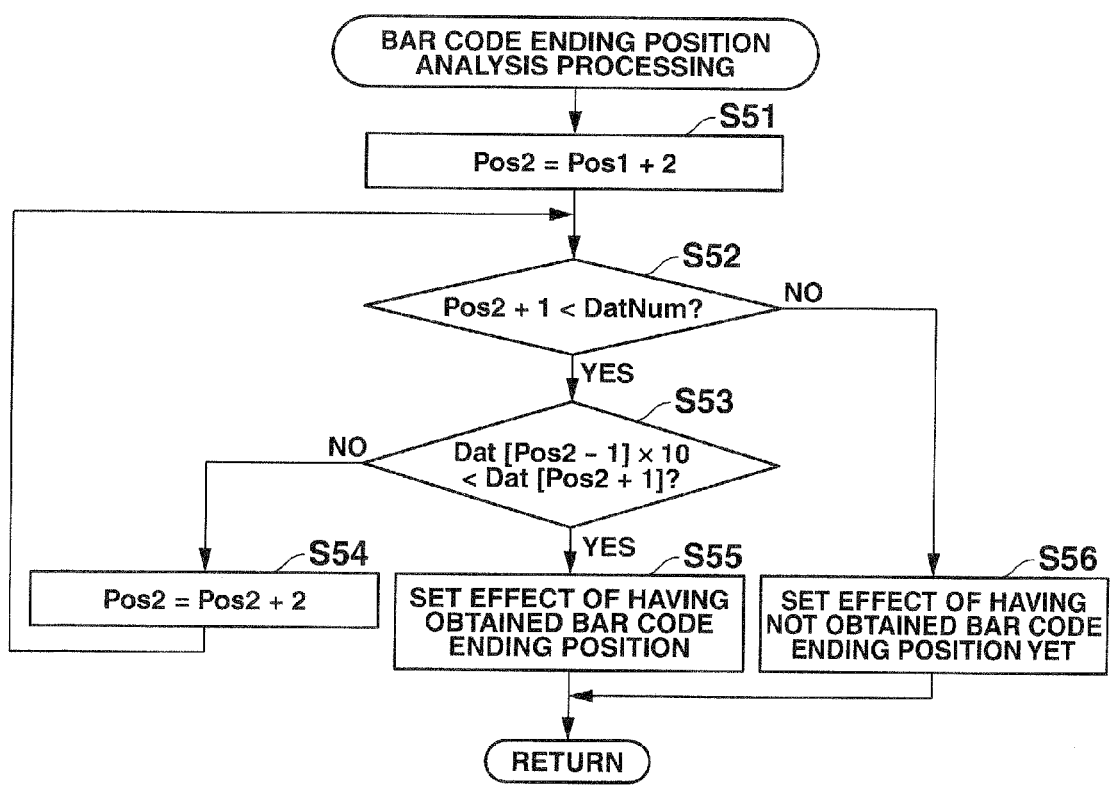
FIG. 6 is a flowchart showing bar code ending position analysis processing of the first scanning processing.

FIG. 6 is a flowchart showing bar code ending position analysis processing of the first scanning processing.

Figure 7:
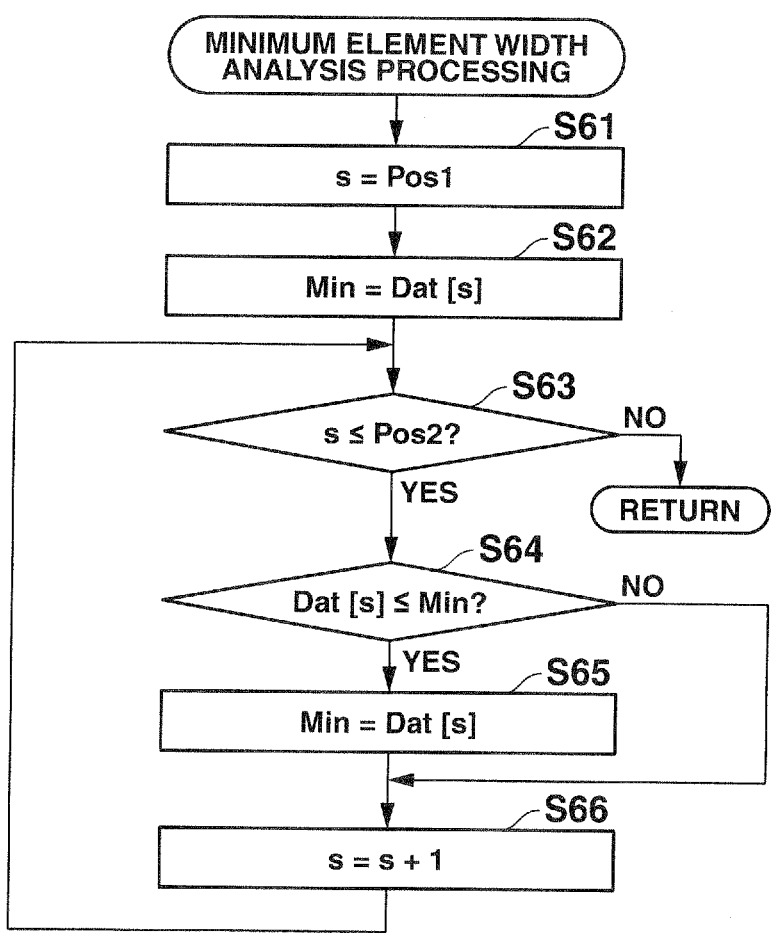
FIG. 7 is a flowchart showing minimum element width analysis processing of the first scanning processing.

FIG. 7 is a flowchart showing minimum element width analysis processing of the first scanning processing.

Figure 8:
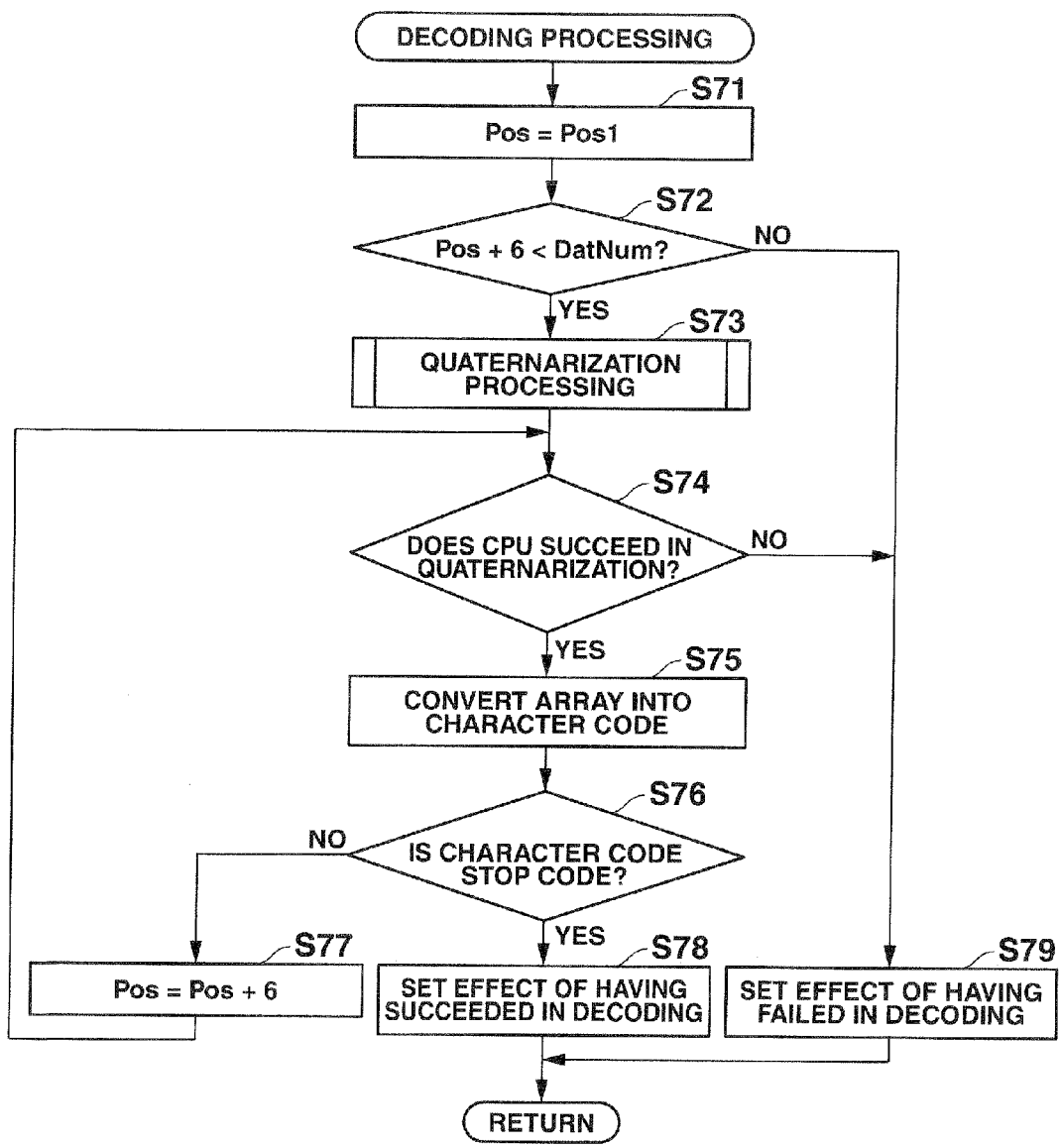
FIG. 8 is a flowchart showing decoding processing of the first scanning processing.

FIG. 8 is a flowchart showing decoding processing of the first scanning processing.

Figure 9:
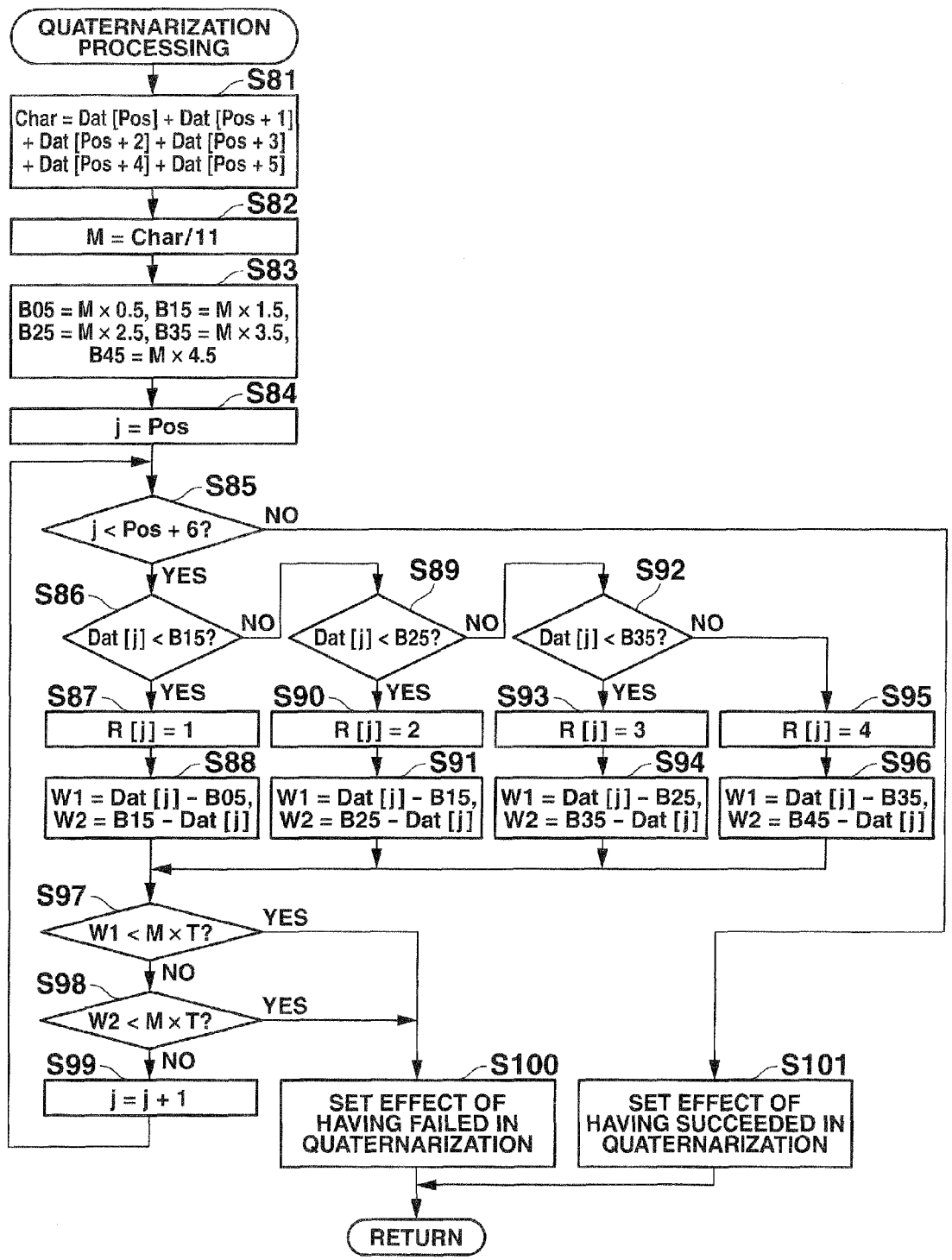
FIG. 9 is a flowchart showing quaternerization processing of the decoding processing.

FIG. 9 is a flowchart showing quaternarization processing of the decoding processing.

The first scanning processing to be executed by the scanner device 10 is processing for scanning the bar code as the capture target and for capturing information. A position and attitude of the scanner device 10 are adjusted in advance by the user so that the bar code as the capture target can be matched with an emitting direction of the laser beam from the scanner unit 18. More specifically, an amplitude direction of the laser beam of the scanner unit 18 is matched with a longitudinal direction of the bar code.

Here, a description is made of an example of capturing a bar code of Code 128 as a standard in which each character included in the bar code is composed of six elements (three black bars and three white spaces). However, the present invention is not limited to this, and such a configuration may be adopted, in which a bar code is captured, the bar code being of a standard in which each character included in the bar code is six elements other than those of Code 128, on in which each character is made of elements of which number is other than six.

In the scanner device 10, while taking, as a trigger, the mater that a trigger button for the bar code scan in the operation unit 12 is pressed by the user, the CPU 11 executes first scanning processing in cooperation with the first scan program 151 read out from the ROM 15 and expanded in the RAM 13. The CPU 11 starts counting by a timer at the same time when the first scanning processing is started.

As shown in FIG. 3 and FIG. 4, first, in response to a count value of the timer, the CPU 11 judges whether or not a time-out occurs as a result that a preset predetermined time has elapsed since the scanning processing was started (Step S11). This predetermined time is a time to cause the time-out for ending the scanning processing. In the case where the time out occurs (Step S11: YES), the first scanning processing is ended.

In the case where the time-out does not occur (Step S11: NO), the CPU 11 completes the obtainment of the image data of the bar code from the scanner unit 18 (Step S12). It is assumed that the image data has arrays Dat[0], Dat[1], Dat[2] . . . as respective data widths of the black bars and the white spaces, which are arrayed from left to right in the image of the bar code. For example, a data width of the white space on the left side of the bar code becomes the array Dat[0], and a data width of the black bar on the most left side of the bar code becomes the array Dat[1].

Then, the CPU 11 performs the bar code starting position analysis processing for the image data of the bar code, which is obtained in Step S12 Step S13).

Here, a description is made of the bar code starting position analysis processing of Step S13 with reference to FIG. 5. First, the CPU 11 sets 1 for a variable Pos1 of a bar code starting position (black bar position on a left end of the bar code) of the image data (Step S41).

Then, the CPU 11 judges whether or not a variable Pos1+1 is smaller than the number DatNum of all the elements of the image data (Step S42). In Step S42, it is judged whether the variable Pos1+1 is normal as a result of not going beyond a right end of the bar code of the image data or abnormal as a result of going beyond the same.

In the case of Pos1+1<DatNum (Step S42: YES), the variable Pos1+1 is normal, and the CPU 11 judges whether or not an array Dat[Pos1+1]×10 is smaller than an array Dat[Pos1−1] (Step S43). In Step S43, it is judged whether or not a value ten times the array Dat[Pos1+1] is smaller than that of the array Dat[Pos1−1] to the left thereof and with the same color as a color thereof, and whether or not the array Dat[Pos1−1] concerned on the left and with the same color is a large white space portion to the left of the bar code of the image data.

In the case of Dat[Pos1+1]×10≥Dat[Pos1−1] (Step S43: NO), the array Dat[Pos1−1] is not the large white space portion, and the CPU 11 increases the variable Pos1 by one (Step S44), and the CPU 11 shifts to Step S42.

In the case of Dat[Pos1+1]×10<Dat[Pos1−1] (Step S43: YES), the array Dat[Pos1−1] is the large white space portion, and the CPU 11 sets the effect that the bar code starting position is obtained (Step S45), and ends the bar code starting position analysis processing.

In the case of Pos1+1≥DatNum (Step S42: NO), the variable Pos1+1 is abnormal, and the CPU 11 sets the effect that the bar code starting position is not obtained yet (Step S46), and ends the bar code starting position analysis processing.

Then, returning to FIG. 3, the CPU 11 judges whether or not to have succeeded in obtaining the bar code starting position Pos1 in response to an obtainment result of Step S13 (Step S14). In the case of having failed in obtaining the bar code starting position Pos1 (Step S14: NO), the CPU 11 shifts to Step S11.

In the case of having succeeded in obtaining the bar code starting position Pos1 (Step S14: YES), the CPU 11 executes bar code ending position analysis processing (Step S15).

Here, a description is made of the bar code ending position analysis processing with reference to FIG. 6. First, the CPU 11 sets a bar code starting position Pos1+2 in a variable Post of a bar code ending position (black bar position on a right end of the bar code) of the image data (Step S51). Pos1+2 corresponds to the position of the black bar to the right of the black bar at the bar code starting position.

Then, the CPU 11 judges whether or not a variable Pos2+1 is smaller than the number DatNum (Step S52). In Step S52, it is judged whether the variable Pos2+1 is normal as a result of not going beyond the right end of the bar code of the image data or abnormal as a result of going beyond the same.

In the case of Pos2+1<DatNum (Step S52: YES), the variable Pos2+1 is normal, and the CPU 11 judges whether or not an array Dat[Pos2−1]×10 is smaller than an array Dat[Pos2+1] (Step S53). In Step S53, it is judged whether or not a value ten times the array Dat[Pos2−1] is smaller than that of the array Dat[Pos2+1] to the right thereof and with the same color as a color thereof, and whether or not the array Dat[Pos2+1] concerned on the right and with the same color is a large white space portion to the right of the bar code of the image data.

In the case of Dat[Pos2−1]×10≥Dat[Pos2+1] (Step S53: NO), the array Dat[Pos2+1] is not the large white space portion, and the CPU 11 increases the variable Pos2 by two (Step S54), and the CPU 11 shifts to Step S52.

In the case of Dat[Pos2−1]×10<Dat[Pos2+1] (Step S53: YES), the array Dat[Pos2+1] is the large white space portion, and the CPU 11 sets the effect that the bar code ending position is obtained (Step S55), and ends the bar code ending position analysis processing.

In the case of Pos2+1≥DatNum (Step S52: NO), the variable Pos2+1 is abnormal, and the CPU 11 sets the effect that the bar code ending position is not obtained yet (Step S56), and ends the bar code ending position analysis processing.

Then, returning to FIG. 3, the CPU 11 judges whether or not to have succeeded in obtaining the bar code ending position Pos2 in response to an obtainment result of Step S15 (Step S16). In the case of having failed in obtaining the bar code ending position Pos2 (Step S16: NO), the CPU 11 shifts to Step S11.

In the case of having succeeded in obtaining the bar code ending position Pos2 (Step S16: YES), the CPU 11 executes minimum element width analysis processing (Step S17).

Here, a description is made of the minimum element width analysis processing with reference to FIG. 7. First, the CPU 11 assigns the bar code starting position Pos1 to a variable s of an element position (Step S61). Then, the CPU 11 assigns an array Dat[s] to a variable Min of a minimum element width (Step S62).

Then, the CPU 11 judges whether or not the variable s is equal to or less than the bar code ending position Pos2 (Step S63). In the case of s≤Pos2 (Step S63: YES), the CPU 11 judges whether or not the array Dat[s] is equal to or less than the variable Min (Step S64).

In the case of Dat[s]≤Min (Step S64: YES), the CPU 11 assigns the array Dat[s] to the variable Min (Step S65). Then, the CPU 11 increases the variable s by one (Step S66), and shifts to Step S63. In the case of Dat[s]>Min (Step S64: NO), and the CPU 11 shifts to Step S66.

In the case of s>Pos2 (Step S63: NO), the CPU 11 ends the minimum element width analysis processing.

Then, returning to FIG. 3, the CPU 11 judges whether or not the minimum element width Min is smaller than a preset reference value (Step S18). The reference value of Step S18 is a reference value for judging whether the capture distance of the bar code by the scanner unit 18 is long or short. The reference value is included in the first scan program or is stored in the ROM 15.

In the case of the minimum element width Min<the reference value (Step S18: YES), the CPU 11 assigns 0.25 to a variable T, and assigns 3 to a variable C of the number of times that the collation is implemented (Step S19). The variable T is a parameter indicating to which extent a ratio error of the bar is to be permitted. As the variable T is being smaller, the analysis is performed while permitting the error more. In the case of the minimum element width Min≥the reference value (Step S18: NO), the CPU 11 assigns 0 to the variable T, and assigns 1 to the variable C (Step S20).

Then, the CPU 11 assigns 0 to a variable i of the number of loop times (Step S21). Then, the CPU 11 executes the decoding processing (Step S22).

Here, a description is made of the decoding processing of Step S22.

First, the CPU 11 assigns the bar code starting position Pos1 to a variable Pos (Step S71). Then, the CPU 11 judges whether or not a value of a variable Pos+6 is smaller than the number DatNum (Step S72). 6 to be added in Step S16 is the number of black bars and white spaces for one character of the bar code.

In the case of Pos+6<DatNum (Step S72: YES), the CPU 11 executes the quaternarization processing (Step S73). Here, a description is made of the quaternarization processing of Step S73 with reference to FIG. 9.

In the standard of Code 128, for the data widths of the black bars and the white spaces, four types of values (thicknesses) are set. The quaternarization processing is processing for judging which of the four types of values the data widths of the respective three black bars and the respective three white spaces are by using the threshold value and the variable T in the image data for one character. Note that the data widths of the black bars and the white spaces are not limited to four types in the standard of the bar code.

As shown in FIG. 9, first, the CPU 11 adds the arrays Dat[Pos], Dat[Pos+1], Dat[Pos+2], Dat[Pos+3], Dat[Pos+4] and Dat[Pos+5] to one another, and calculates a variable Char of the image data for one character (Step S81).

First, the CPU 11 sets, as a variable M, a value obtained by dividing the variable Char by 11 (Step S82). In the standard of Code 128, the data width of the image data for one character is constant at a value 11. In Step S82, the variable Char for one character is divided by (value) 11, whereby a data width of the image data, which corresponds to a value 1, is calculated as the variable M.

Then, the CPU 11 sets, as a variable B05, a value obtained by multiplying the variable M by 0.5, sets, as a variable B15, a value obtained by multiplying the variable M by 1.5, sets, as a variable B05, a value obtained by multiplying the variable M by 0.5, sets, as a variable B25, a value obtained by multiplying the variable M by 2.5, sets, as a variable B35, a value obtained by multiplying the variable M by 3.5, and sets, as a variable B45, a value obtained by multiplying the variable M by 4.5 (Step S83). The variables B05, B15, B25, B35 and B45 are variables of data widths of the image data, which correspond to a 0.5 time, 1.5 times, 2.5 times, 3.5 times and 4.5 times of the value 1 in this order. In the quaternarization processing, the variables B05, B15, B25, B35 and B45 are used as threshold values for judging (quaternarizing) the data widths of the black bars and the white spaces.

Then, the CPU 11 sets the variable Pos into a loop counter j (Step S84). Then, the CPU 11 judges whether or not the loop counter j is smaller than the variable Pos+6 (Step S85). In the case of j<Pos+6 (Step S85: YES), the CPU 11 judges whether or not an array Dat[j] is smaller than the variable B15 (Step S86).

In the case of Dat[j]<B15 (Step S86: YES), the CPU 11 sets 1 to a quaternary array R[j] with the data width of the black bar or the white space, which corresponds to the loop counter (Step S87). Then, the CPU 11 sets, as a variable W1, a value obtained by subtracting the variable B05 from the array Dat [j], and sets, as a variable W2, a value obtained by subtracting the array Dat[j] from the variable B15 (Step S88). The variable W1 is a variable of a distance between the array Dat[j] and the threshold value (variable B05, B15, B25 or B35) on the left side of the array Dat[j]. The variable W2 is a variable of a distance between the threshold value (variable B15, B25, B35 or B45) on the right side of the array Dat[j] and the array Dat[j].

In the case of Dat[j]≥B15 (Step S86: NO), the CPU 11 judges whether or not the array Dat[j] is smaller than the variable B25 (Step S89). In the case of Dat[j]<B25 (Step S89: YES), the CPU 11 sets 2 to the array R[j] (Step S90). Then, the CPU 11 sets, as the variable W1, a value obtained by subtracting the variable B15 from the array Dat[j], and sets, as the variable W2, a value obtained by subtracting the array Dat[j] from the variable B25 (Step S91).

In the case of Dat[j]≥B25 (Step S89: NO), the CPU 11 judges whether or not the array Dat[j] is smaller than the variable B35 (Step S92). In the case of Dat[j]<B35 (Step S92: YES), the CPU 11 sets 3 to the array R[j] (Step S93). Then, the CPU 11 sets, as the variable W1, a value obtained by subtracting the variable B25 from the array Dat[j], and sets, as the variable W2, a value obtained by subtracting the array Dat[j] from the variable B35 (Step S94).

In the case of Dat[j]≥B35 (Step S92: NO), the CPU 11 sets 4 to the array R[j] (Step S95). Then, the CPU 11 sets, as the variable W1, a value obtained by subtracting the variable B35 from the array Dat[j], and sets, as the variable W2, a value obtained by subtracting the array Dat[j] from the variable B45 (Step S96).

After executing Steps S88, S91, S94 and S96, the CPU 11 judges whether or not the variable W1 is smaller than a value obtained by multiplying the variable M by the variable T (Step S97). In the case of W1≥M×T (Step S97: NO), the ratio error is within a permissible range, and the CPU 11 judges whether or not the variable W2 is smaller than the value obtained by multiplying the variable M by the variable T (Step S98).

In the case of W2≥M×T (Step S98: NO), the ratio error is within the permissible range, and the CPU 11 increases the loop counter j by 1 (Step S99), and shifts to Step S85. In the case of W1<M×T (Step S97: YES), the CPU 11 sets the effect of having failed in the quaternarization of the black bar and the white space for one character, which correspond to the variable Pos (Step S100), and ends the quaternarization processing. In the case of W2<M×T (Step S98: YES), the CPU 11 shifts to Step S100.

In the case where the variables W1 and W2 are small, a difference between the data widths which should be originally of different levels, such as a difference between the value 1 and a value 2, and a difference between the value 2 and a value 3, is small, the ratio therebetween becomes ambiguous, and a risk of misreading is increased. Accordingly, in Step S100, the effect of having failed in the quaternarization is set.

In the case of j≥Pos+6 (Step S85: NO), the CPU 11 sets the effect of having succeeded in the quaternarization of the black bar and the white space for one character, which correspond to the variable Pos (Step S101), and ends the quaternarization processing.

Returning to FIG. 8, the CPU 11 judges whether or to have succeeded in the quaternarization of the black bar and the white space for one character, which correspond to the variable Pos, in response to a result of the quaternarization processing of Step S73 (that is, Steps S100 and S101) (Step S74). In the case of having succeeded in the quaternarization (Step S74: YES), the CPU 11 converts the array R[j] of the character, which is obtained by the quaternarization processing of Step S73, into a character code (Step S75). Then, the CPU 11 judges whether or not the character code as a resultant of the conversion in Step S75 is a stop code indicating a right end of the bar code (Step S76).

In the case where the character code is not the stop code (Step S76: NO), the CPU 11 increases the variable Pos by 6 (Step S77), and shifts to Step S74. In the case where the character code is the stop code (Step S76: YES), the CPU 11 sets the effect of having succeeded in decoding the image data (Step S78), and ends the decoding processing.

In the case of Pos+6≥DatNum (Step S72: NO), the CPU 11 sets the effect of having failed in decoding the image data (Step S79), and ends the decoding processing. In the case of having failed in the quaternarization (Step S74: NO), the CPU 11 shifts to Step S79. Note that, in the case where the character code is the stop code (Step S76: YES), the CPU 11 may perform checking processing such as check digit by using the character code as the resultant of the conversion in Step S75, may judge whether or not to have finally succeeded in the decoding in response to a check result thereof, may shift to Step S78 in the case of having succeeded in the decoding, and may shift to Step S79 in the case of having failed in the decoding.

Then, returning to FIG. 4, the CPU 11 judges whether or not to have succeeded in the decoding in Step S22 (Step S23). In the case of having failed in the decoding (Step S23: NO), the CPU 11 shifts to Step S30. In the case of having succeeded in the decoding (Step S23: YES), the CPU 11 judges whether or not the variable i is larger than 0 (Step S24).

In the case of 0<i (Step S24: YES), the CPU 11 implements collation between the previous decoding result stored in the RAM 13 and the latest decoding result (Step S25). In the case of 0≥i (Step S24: NO), there is no decoding result as a collation source, and the CPU 11 stores the decoding result, which is obtained in Step S22, as the collation source in the RAM 13 (Step S26).

Then, the CPU 11 judges whether or not the decoding results coincide with each other in the collation of Step S25 (Step S27). In the case where such coincidence is obtained in the collation (Step S27: NO), the CPU 11 shifts to Step S11. In the case where the coincidence is obtained in the collation (Step S27: YES), the CPU 11 judges whether or not the variable i is smaller than a variable C+1 (Step S29). In the case of i<C+1 (Step S29: YES), the CPU 11 waits for input of the next image data from the scanner unit 18, and obtains the inputted next image data (Step S30), and shifts to Step S22.

In the case of i≥C+1 (Step S29: NO), the CPU 11 displays the decoding result, which is obtained in Step S23 and includes the character code, on the display unit 14, allows the notification unit 19 to output the buzzer sound (Step S31), and ends the first scanning processing. In Step S31, the decoding results are stored, for example, in a flash memory 17.

As described above, in accordance with this embodiment, the CPU 11 of the scanner device 10 judges whether or not the capture distance from the scanner unit 18 to the bar code is short. In the case where it is judged that the capture distance is short, the CPU 11 increases error permissivity for the image data with respect to the threshold values (variables B05, B15, B25, B35 and B45) for judging the element width of the bar code (that is, decreases the variables T), and reduces the number of collation times (variable C) for the decoding results. Moreover, in the case where it is judged that the capture distance is long, the CPU 11 lowers the error permissivity for the image data with respect to the threshold values (that is, increases the variables T), and increases the number of collation times (variable C). Then, the CPU 11 decodes the image data in response to such setting described above.

Therefore, the scanner device 10 enhances the capture response in the case where the capture distance for the symbol is short, and also enhances the decoding accuracy in the case where the capture distance for the symbol is long. Accordingly, the scanner device 10 can appropriately set the capture response and the decoding accuracy in response to the capture distance for the symbol.

Moreover, the scanner device 10 judges that the capture distance is short in the case where the minimum element width of the image data is equal to or more than the reference value, and judges that the capture distance is long in the case where the minimum element width of the image data is smaller than the reference value. Therefore, a component that measures the capture distance is not provided, and accordingly, the configuration of the scanner device 10 can be simplified.

Second Embodiment

Figure 10:
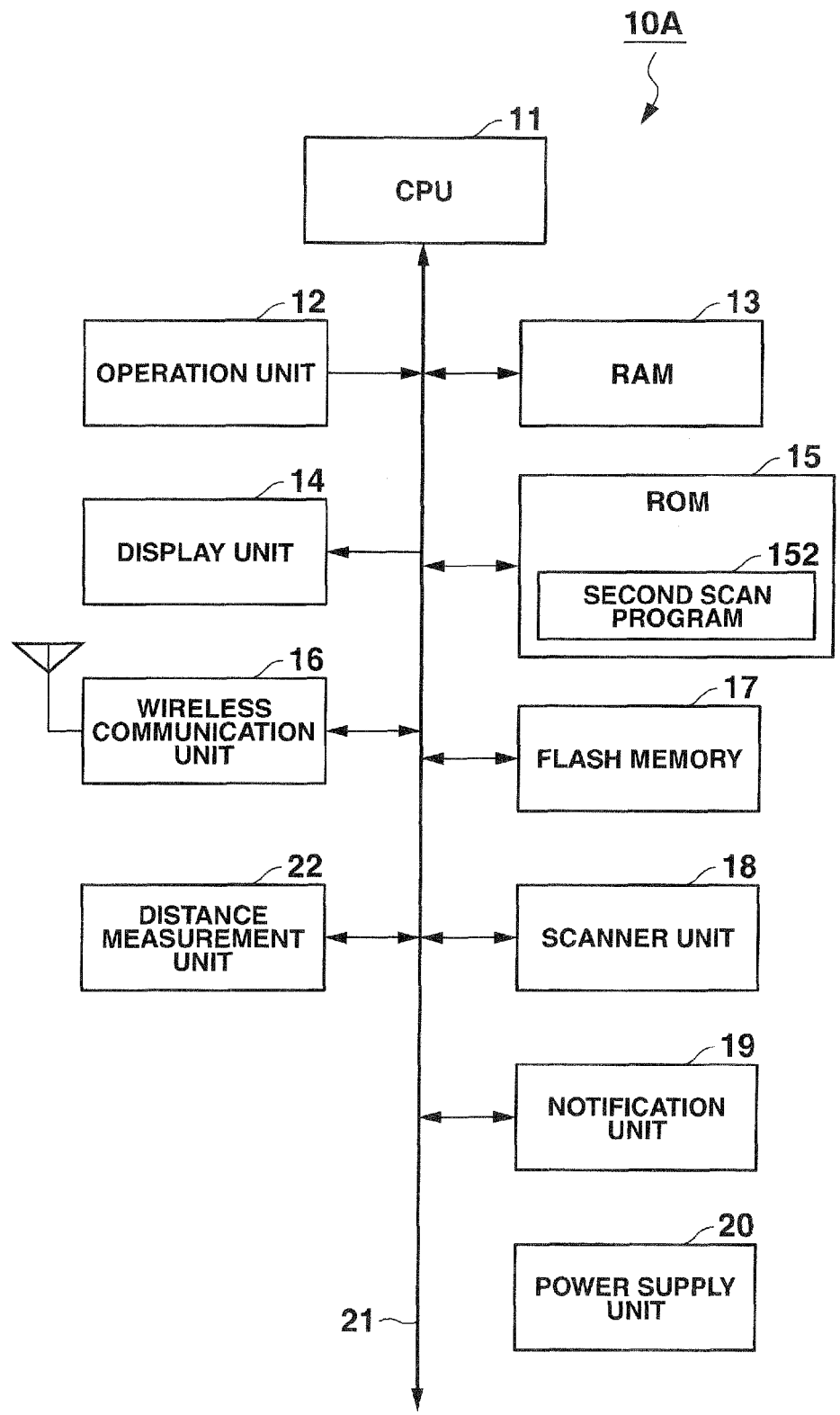
FIG. 10 is a block diagram showing a functional configuration of a scanner device of a second embodiment.

A description is made of a second embodiment according to the present invention with reference to FIG. 10 and FIG. 11.

FIG. 10 is a block diagram showing a functional configuration of a scanner device 10A of this embodiment.

FIG. 11 is a flowchart showing second scanning processing.

The scanner device 10A shown in FIG. 10 includes a distance measurement unit 22 in addition to the respective units of the scanner device 10. The same reference numerals are assigned to portions common to those of the scanner device 10, and a description thereof is omitted.

The distance measurement unit 22 emits an infrared ray, receives a reflected light from a scan target (bar code), thereby measures a capture distance from the scanner device 10A (scanner unit 18) to the bar code, and outputs capture distance information concerned to the CPU 11.

Moreover, it is assumed that, in the ROM 15, a second scan program 152 is stored in place of the first scan program 151.

Next, a description is made of operations of the scanner device 10A with reference to FIG. 11. In the scanner device 10A, while taking, as a trigger, the mater that the trigger button for the bar code scan in the operation unit 12 is pressed by the user, the CPU 11 executes second scanning processing in cooperation with the second scan program 152 read out from the ROM 15 and expanded in the RAM 13 as appropriate. The CPU 11 starts the counting by the timer at the same time when the second scanning processing is started.

As shown in FIG. 11, Steps S111 and S112 are similar to Steps S11 and S12 in the first scanning processing of FIG. 3 and FIG. 4. Then, the CPU 11 measures a capture distance d to the bar code by the distance measurement unit 22 (Step S113). Then, the CPU 11 judges whether or not the capture distance d is larger than a reference value (Step S114). The reference value in Step S114 is a reference value for judging whether the capture distance d is short or long, and is included in the second scan program, or is stored in the ROM 15.

In the case of d>the reference value (Step S114: YES), the CPU 11 shifts to Step S115. In the case of d≤the reference value (Step S114: NO), the CPU 11 shifts to Step S116. Steps S115 to S127 are similar to Steps S19 to S31 in the first scanning processing of FIG. 3 and FIG. 4.

As described above, in accordance with this embodiment, in a similar way to the scanner device 10, the CPU 11 of the scanner device 10A can appropriately set the capture response and the decoding accuracy in response to the capture distance for the bar code. Moreover, the scanner device 10A judges that the capture distance measured by the distance measurement unit 22 is short in the case where the capture distance is equal to or less than the reference value, and judges that the capture distance thus measured is long in the case where the capture distance is larger than the reference value. Therefore, the capture distance can be easily obtained without performing the analysis for the element width in the image data, which corresponds to the capture distance.

In accordance with the preferred embodiments of the present invention, the capture response and the decoding accuracy can be appropriately set in response to the capture distance of the symbol.

The above description discloses the example of using the ROM 15 as a computer readable medium for the program according to the present invention; however, the present invention is not limited to this example.

As other computer readable recording mediums, there are applicable: a non-volatile memory such as a flash memory; and a portable recording medium such as a CD-ROM.

Moreover, as a medium that provides the data of the program according to the present invention through a communication line, a carrier wave is also applied to the present invention.

Note that the description in the above-described embodiments is of an example of the scanner device and the program according to the present invention, and the present invention is not limited to these.

In the above-described embodiments, the configuration is adopted, in which the scanner device 10 is the handy terminal; however, the present invention is not limited to this. Such a configuration may also be adopted, in which, as the scanner device 10, there are used other scanner devices such as a scanner device connected to a personal digital assistant (PDA) and an electronic cash register (ECR), each of which has a laser-mode scanner unit.

Moreover, in the first embodiment, the configuration is adopted, in which it is judged whether the capture distance from the scanner unit to the symbol is short or long in response to whether or not the element width of the symbol in the image data is smaller than the reference value; however, the present invention is not limited to this. For example, such a configuration may be adopted, in which it is judged whether the capture distance from the scanner unit to the symbol is short or long in response to whether or not a symbol width (bar code width) of the image data is smaller than the reference value.

Moreover, in the second embodiment, the distance measurement unit 22 that uses the infrared ray is used as the distance measurement unit 22 that measures the capture distance from the scanner unit to the symbol; however, the present invention is not limited to this. For example, there may be used other distance measurement units such as a distance measurement unit that defines a focal length as the capture distance by using an auto focus mechanism of an imaging unit.

Moreover, in the above-described embodiments, in the case where it is judged that the capture distance is short, the CPU 11 of each of the scanner devices 10 and 10A increases the error permissivity for the image data with respect to the threshold values for judging the element width of the bar code, and reduces the number of collation times for the decoding results, and in the case where it is judged that the capture distance is long, the CPU 11 lowers the error permissivity for the image data with respect to the threshold values, and increases the number of collation times; however, the present invention is not limited to this. In the case where it is judged that the capture distance is short, the CPU 11 may make setting so as to perform at least one of the increase of the error permissivity for the image data with respect to the threshold values and the reduction of the number of collation times for the decoding results, and in the case where it is judged that the capture distance is long, the CPU 11 may make setting so as to perform at least one of the lowering of the error permissivity for the image data with respect to the threshold values and the increase of the number of collation times.

Moreover, in the above-described embodiments, the configuration is adopted, in which the scanner unit 18 is the laser-mode scanner unit that captures the bar code as the symbol; however, the present invention is not limited to this. For example, the scanner unit may be an image scanner that images and captures the bar code or a two-dimensional code as the symbol.

Moreover, it is a matter of course that detailed configurations and detailed operations of the scanner devices 10 and 10A in the above-described embodiments are changeable within the scope without departing from the spirit of the present invention.

The description has been made above of the embodiments of the present invention; however, the scope of the present invention is not limited to the above-described embodiments, and incorporates therein the scope of the invention, which is described in the scope of claims, and an equilibrium range thereof.

What is claimed is:

1. A scanner device comprising:
    a scanner unit that scans a symbol and obtains image data;
    a judgment unit that judges whether a capture distance from the scanner unit to the symbol is a short distance or a long distance; and
    a decoding unit that:
        (i) in a case where the capture distance is judged to be the short distance, makes a setting so as to perform:

(a) an increase of error permissivity for the image data with respect to threshold values for judging a size of the symbol, or
(b) a reduction of a number of collation times for decoding results of the image data, and
(ii) in a case where the capture distance is judged to be the long distance, makes a setting so as to perform:
(a) a lowering of the error permissivity for the image data with respect to the threshold values, or
(b) an increase of the number of collation times;
wherein the decoding unit then decodes the image data in response to the setting.

2. The scanner device according to claim 1, wherein the judgment unit judges that the capture distance is the short distance in a case where the size of the symbol in the image data is equal to or more than a reference value, and judges that the capture distance is the long distance in the case where the size of the symbol in the image data is smaller than the reference value.

3. The scanner device according to claim 2, wherein the judgment unit judges that the capture distance is the short distance in a case where an element width of the symbol in the image data is equal to or more than a reference value, and judges that the capture distance is the long distance in a case where the element width of the symbol in the image data is smaller than the reference value.

4. The scanner device according to claim 1, further comprising a distance measurement unit that measures the capture distance from the scanner unit to the symbol,
wherein the judgment unit judges that the capture distance is the short distance in a case where the capture distance measured by the distance measurement unit is equal to or less than a reference value, and judges that the capture distance is the long distance in a case where the measured capture distance is more than the reference value.

5. A non-transitory computer-readable recording medium having stored thereon a computer program that is readable by a computer for use in a scanner device, the computer program causing the computer to perform functions comprising:
scanning a symbol and obtaining image data;
judging whether a capture distance from a scanner unit to the symbol is a short distance or a long distance;
in a case where the capture distance is judged to be the short distance, making a setting so as to perform: (i) an increase of error permissivity for the image data with respect to threshold values for judging a size of the symbol, or (ii) a reduction of a number of collation times for decoding results of the image data;
in a case where the capture distance is judged to be the long distance, making a setting so as to perform: (i) a lowering of the error permissivity for the image data with respect to the threshold values, or (ii) an increase of the number of collation times; and
then decoding the image data in response to the setting.

6. A scanner device comprising:
an imaging unit that images a symbol and obtains image data;
a judgment unit that judges whether a capture distance from the imaging unit to the symbol is a short distance or a long distance; and
a decoding unit that,
(i) in a case where the capture distance is judged to be the short distance, makes a setting so as to perform:
(a) an increase of error permissivity for the image data with respect to threshold values for judging a size of the symbol, or
(b) a reduction of a number of collation times for decoding results of the image data,
(ii) in a case where the capture distance is judged to be the long distance, makes a setting so as to perform:
(a) a lowering of the error permissivity for the image data with respect to the threshold values, or
(b) an increase of the number of collation times;
wherein the decoding unit then decodes the image data in response to the setting.

* * * * *